(No Model.)
L. APPLETON.
Dividing Scale.
No. 239,691. Patented April 5, 1881.
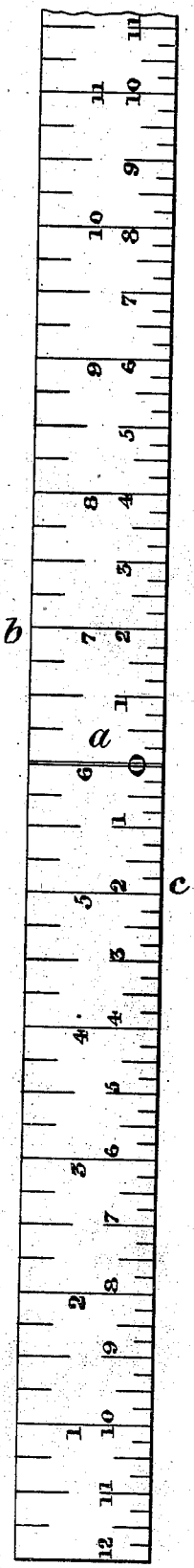
Attest:
William Paxton.
J. O. McCleary.
Leonard Appleton
By his attorney
Charles E. Foster

UNITED STATES PATENT OFFICE.

LEONARD APPLETON, OF BRECKNOCK CRESCENT, COUNTY OF MIDDLESEX, ENGLAND.

DIVIDING-SCALE.

SPECIFICATION forming part of Letters Patent No. 239,691, dated April 5, 1881.

Application filed October 16, 1880. (No model.)

*To all whom it may concern:*

Be it known that I, LEONARD APPLETON, a citizen of England, residing at Brecknock Crescent, in the county of Middlesex, England, accountant, have invented a new and useful Improvement in Rules, Tapes, and other like Lineal Measures, of which the following is a specification.

My invention consists of a peculiar system or mode of dividing or marking rules, tapes, and other like lineal measures, whether straight or curved, rigid or flexible, whereby such measures are rendered capable of indicating at a glance and without any calculation the exact center of any given object, space, or dimension, or any distance, whether equal or otherwise, from opposite sides of such center. I attain these objects by marking or dividing one edge or side of the rule or tape with lines or marks indicating inches, feet, yards, or other given measures, reading, as in the usual manner, from one end to the other of the rule or measure, while the opposite edge or side is marked or divided in half-measures—namely, in half-inches, half-feet, or half-yards, and so on, as the case may be—or according to the unit of measure adopted. The side which indicates the half-measures is marked in the middle or center with zero (0) or any equivalent mark, and the half divisions or measures are numbered successively from the said center mark to the right and left thereof. Thus, supposing the particular measure employed be thirty-six inches in length, one side or edge will be marked or divided into seventy-two half-inches, reading thirty-six half-inches from the center to the right and left thereof.

The accompanying drawing represents, as an example, a straight rule divided according to my invention.

*a* is the rule or measure, one edge, *b*, of which is divided into equal spaces, with lines or marks indicating inches, feet, yards, or other given units of lineal measure, or fractions thereof, reading, as shown in the drawing, from one end to the other of the rule or measure. As an example, I have adopted in my drawing the inch as my unit of measure. The opposite face of the rule or the opposite edge, *c*, of the same face is divided into equal parts, each part being one-half the length of the divisions marked on the edge *b*—that is to say, they represent half-inches, (or fractions,) half-feet, (or fractions,) half-yards, (or fractions,) and so on.

0 is the mark which indicates the middle or longitudinal center of the rule or measure, and the said half-divisions are numbered successively from the said central mark to the right and left thereof, as shown in my drawing.

In using my improved measure for the purpose of finding at a glance the exact middle or center of any given space or object which, when measured by the divided edge *b* of the rule, gives, say, ten inches and three-quarters over all, it is simply requisite to place either of the half-divisions on the edge *c*, marked 10¾ on one side or end of the said space or object, when the mark zero (0) on the measure will indicate the exact position of the required center.

The hereinbefore-described improved measures may be constructed of any of the materials from which lineal measures have hitherto been manufactured—such, for example, as wood, metal, linen, paper, or textile fabric, or from any other material or substance suitable for the purpose—and may be adapted for the smallest office work as well as for larger operations in the field.

It is obvious that scales for one-third, one-fifth, or any other fraction may be made in the same way; also, that it is not necessary in their construction to employ the inch, foot, or any other known and recognized unit of length, but that any arbitrary equal divisions may be employed, the essential character of the invention only requiring that the divisions on the two subordinate scales shall be exact fractions of those in the principal scale.

I claim—

A scale or lineal measure consisting of a series of equal graduations numbered consecutively from end to end, in combination with two series of graduations, each of which is one-half the length of one of the former, the latter being numbered, respectively, to the right and left from the middle of the scale, substantially as and for the purpose set forth.

LEONARD APPLETON.

Witnesses:
JAMES H. FROST,
   *33 Walcot Square, Kennington, S. E.*
GEORGE BRIGHTWELL,
   *Roslin Villa, Acre Lane, Brixton.*